UNITED STATES PATENT OFFICE.

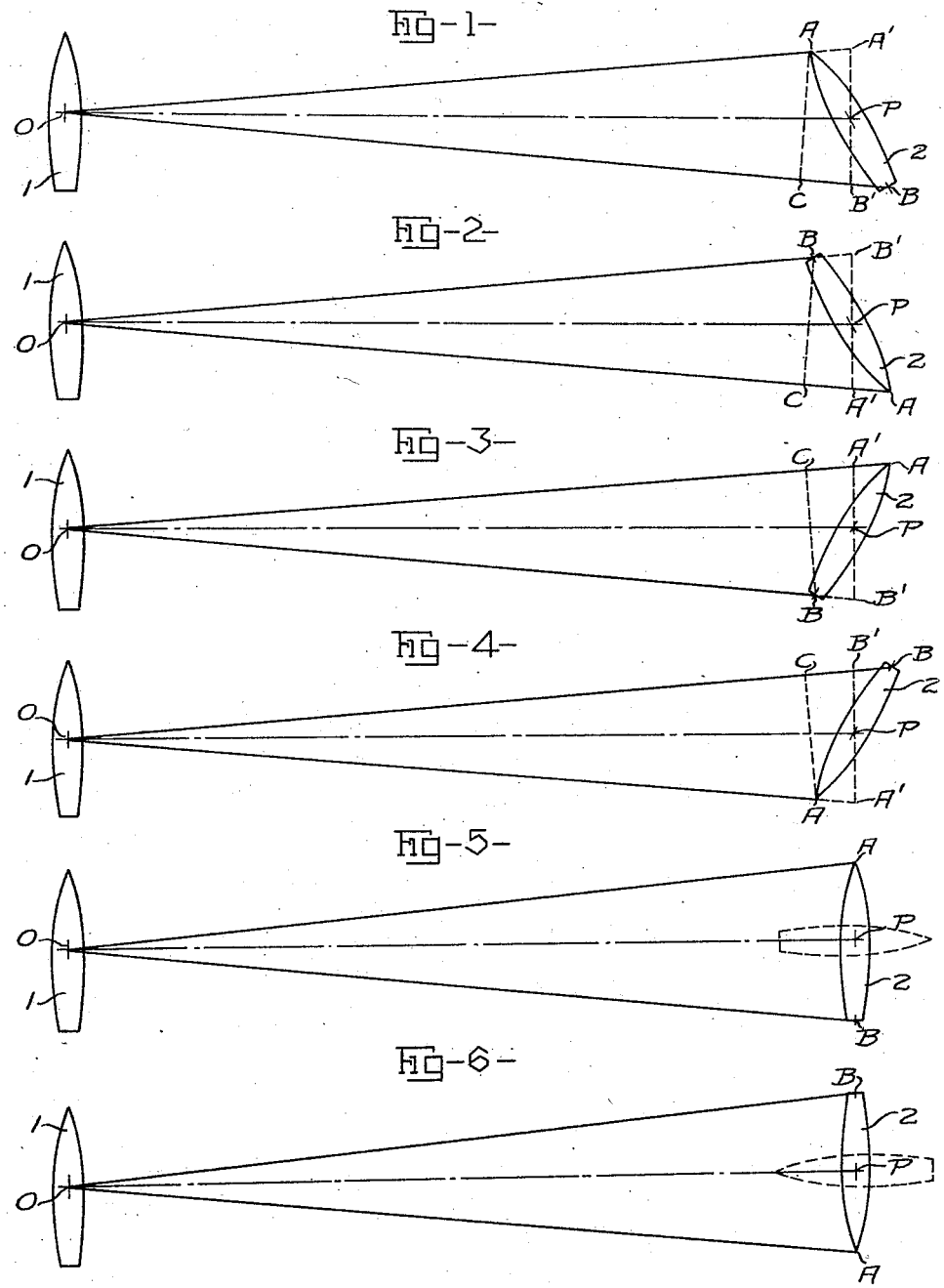

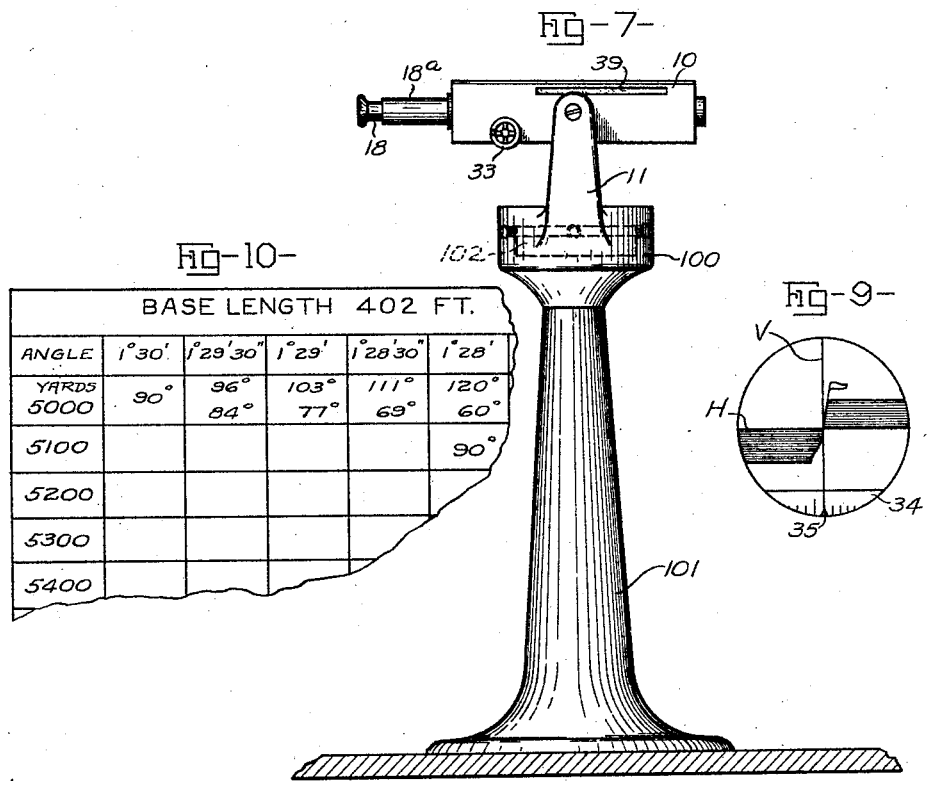
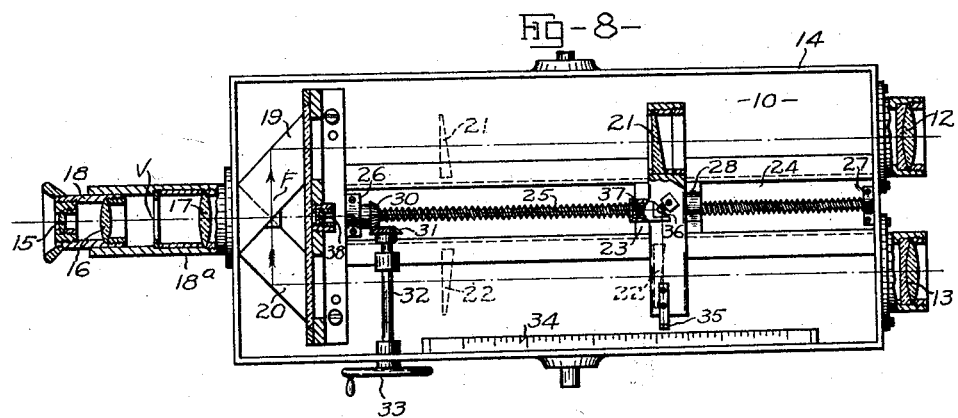

HENRY A. ORR, OF THE UNITED STATES NAVY, ASSIGNOR TO GOVERNMENT OF THE UNITED STATES.

METHOD OF DETECTING THE COURSE OF A SHIP.

1,406,218.  Specification of Letters Patent.  Patented Feb. 14, 1922.

Application filed July 9, 1919. Serial No. 309,771.

*To all whom it may concern:*

Be it known that I, HENRY A. ORR, lieutenant in the United States Navy, a citizen of the United States, and a resident of Washington, District of Columbia, have invented a certain new and useful Method of Detecting the Course of a Ship; and I do declare the following to be a full, clear, and exact description of the same, reference being had to the accompanying drawings, forming a part of this specification, and to the characters of reference thereon.

My invention relates to navigation and gunnery and more particularly relates to detecting and plotting the position and course of an isolated elongated object, such as a ship at sea.

The detection of the course of an enemy's ship is a necessary procedure in coast defence and naval fleet gunnery, not only that its instantaneous position relatively to the observing station, whether the latter be a fort or a vessel, may be ascertained, but also in order that the relative position of the enemy's ship and the observing station may be predicted for any time in the immediate future on the assumption that the enemy's ship holds to its course. Heretofore it has been necessary when determining the course of an enemy's ship to take its compass bearing and range from the observing station at different intervals, and to plot these points to scale by the polar co-ordinate system, using the observing station as the origin, thus a line traced through these plotted points will denote the course of the enemy's ship and a line extending between any two of them will indicate the course of the ship between the intervals of time at which these respective observations were taken. If the observations were taken from a moving vessel, it is obvious that the movement and course of that vessel must be plotted before the instantaneous location of the enemy's vessel can be plotted, since the observing station will also occupy a different position at each interval.

It will be noted that a feature of this method of course detecting is that two sets of observations separated by intervals of time must be taken, which procedure takes usually about 10 or 15 minutes before the course of the enemy's ship can be determined. Since it is of considerable importance for the observer to obtain accurate and prompt information concerning the enemy's course, the delay necessarily inherent in the foregoing method of course detecting is a manifest disadvantage.

Objects of the present invention are to provide a method of detecting and plotting the instantaneous course of a ship isolated from an observing station without delay, which method is simple, accurate and reliable, and does not require any additional personnel in its execution; and to provide apparatus whereby this method may be conveniently practiced by comparatively inexperienced men. Other objects will hereinafter become apparent.

In the drawings: Figures 1 to 6 inclusive are diagrams illustrating my improved method of course detecting; Figure 7 is a side elevation of an apparatus for obtaining the azimuth bearing and for measuring the angle subtended by the apparent length of the object sighted; Figure 8 is a detached plan view on an enlarged scale, of the optical angle measuring means mounted at the upper portion of the apparatus shown in Figure 7, its cover having been removed and portions having been shown in section to disclose the interior parts, and the scale of the instrument having been turned into a plane parallel to the plane of the plan to facilitate illustration; Figure 9 illustrates the field of view of the optical angle measuring means shown in Figures 7 and 8 when it is trained upon an object such as a ship, and after it has been adjusted to bring the opposite ends of the object into coincidence; and Figure 10 is a specimen portion of one of a series of tables comprising a calculator co-ordinated to the apparatus shown in Figure 7.

My improved method of course detecting is based on the proposition that, if the location of an elongated object of known length situated at a known distance from the station of an observer is known and the angle subtended by its apparent length as viewed by the observer be accurately measured, the direction of the longitudinal axis of that object may be determined by triangulation and observation. The relative positions of the observer's station, the object and the direction of the longitudinal axis of the object may then be plotted from the data obtained from the solution of the mathematical problem involved.

Referring now more particularly to Figure 1 of the drawings: let it be presumed that O is the instantaneous location and position of the station of the observer on board the vessel 1; that 2 indicates the enemy vessel in its instantaneous location and position; that the length of the longitudinal axis A B of the latter is known to be 402 feet; and that the distance from the observer's station O to the enemy ship is known from range finder readings to be 5000 yards. It will be observed that the range of the enemy's ship, which is its distance from the vessel 1, as ordinarily taken by range finder readings, is actually the distance from a point such as O on the vessel 1 to a point such as P on the enemy ship 2, but since the angle A O B is very small, and the dimensions of the vessels 1 and 2 are so small as compared with the distance separating them that the distances A O, O P and O B will be found for practical purposes to be all equal to the range of the enemy ship 2 as taken from the vessel 1. If the observer now ascertains the location or bearing of the enemy ship 2, that is, ascertains the direction of the line O A extending between the two ships either relatively to the longitudinal axis of the ship 1 or relatively to the points of the compass; measures the angle subtended by the apparent length A C of the enemy vessel 2 thus obtaining the angle A O B; and observes on which side of the line O P the bow of the enemy vessel lies, and whether the angle O A B be acute or obtuse; the triangle O A B may be solved to determine the angle A O B, as regards which one of its four solutions obtains in determining the course a ship is steering.

Let A B be the magnitude in feet, that would be subtended at the given distance O P, by the enemy ship of known length; if it were sailing perpendicular to the line of sight O P between the two ships.

Let A′ B′ be the actual visual magnitude in feet corresponding to the actually observed angle of the given distance O P and let I be the angle A P A′ made by the enemy ship's course with the line A′ P B′ perpendicular to O P the line of sight.

Then $$\frac{A'B'}{AB} = \cos I$$

or log A′ B′ − log A B = log cos I

Or were the complementary angle A P O desired, log cos I = log sin A P O.

It will be seen that even if the bearing or the direction of the line O P and the apparent length A′ B′ of the enemy ship 2, and thus the angle A O B, be the same: as shown in each of the Figures 1, 2, 3 and 4, that there are four possible courses on which the enemy's ship could be plying, since first of all, the direction of the longitudinal axis A B of the ship, and thus its course could extend as shown in Figures 1 and 2 or it could extend in the direction shown in Figures 3 and 4, and in each of the two cases, the direction in which the ship is traveling could either be as shown in Figures 1 and 3 or as shown in Figures 2 and 4. The actual course may readily be identified however, from the observations of the observer who will state on which side of the line O P a specified end such as the bow of the enemy ship lies, and then who will determine by inspection and report the magnitude, within certain limits, of a specified angle included between a straight line such as O P, extending from the observing station to the ship 2 and the direction of length of the latter, that is to say, whether the angle A P O be acute or obtuse.

If however, the longitudinal axis of the enemy ship be either normal to the line O P as shown in full lines in Figures 5 and 6, or parallel to said line O P as shown in dotted lines in the same figures, then the only observation necessary beyond the observation of the direction of the line O P and the angle A O B is as to the direction of travel of the enemy ship 2.

In carrying out my method of course detecting on board a vessel such as 1, I prefer to place one man, the observer, at the observing station, which may be a fighting top where the apparatus illustrated in Figure 7 is set up, and to place a second man, the plotter, at a plotting board in the plotting room. The plotter is provided with a calculator which may consist of a set of tables similar to that illustrated in Figure 10 and means are provided whereby the plotter may be advised of the length of the ship 2 and its range by those members of personnel of the vessel who are assigned to the duty of obtaining this data. Means is also provided whereby the observer may communicate to the plotter the bearing of the ship sighted, the angle subtended by its apparent length and his observations relative to the direction of travel of the ship to and relative to the angle A P O.

The apparatus illustrated in Figure 7 is particularly adapted to simultaneously obtain, with rapidity and precision the angle subtended by the apparent length of the ship sighted and its bearing, and comprises what I may term a combined goniometer and sighting telescope of the coincidence image type, which is trunnioned in a pair of standards 11 carried on an azimuth case 100 which is mounted so as to be freely rotatable in a horizontal plane upon the pedestal 101. Within the azimuth case 100 is mounted an azimuth circle which, when the optical instrument 10 is trained upon the enemy ship 2 indicates the relative bearing of enemy, that is, the direction of the line O P relatively to the ship's head.

The optical instrument 10 embodies a pair of objectives 12 and 13 mounted at the forward end of the casing 14 which are adapted to form superimposed images of the object sighted in their common focal plane F situated in the field of the lens system comprising the ocular lenses 15 and 16 and the erecting lens 17. The ocular prism co-operating with the objectives 12 and 13 and the lens system within the adjustable ocular mounting 18, is an ocular prism adapted to form a composite image of the object sighted consisting of an upper image portion formed by one objective and a lower image portion formed by the other objective, and it may consist of an upper rhomb shaped reflecting prism 19 and a lower rhomb shaped reflecting prism 20 arranged one above the other and having their contacting surfaces cemented together. The junction of these prisms forms a horizontal image dividing line H (see Figure 9) in the field of the ocular and said prisms 19 and 20 are adapted respectively to reflect the upper half of the image formed by the objective 12 and the lower half of the image formed by the objective 13 into the field of the ocular. It will thus be seen that the objective 12 forms the portion of the image appearing above the halving line H and that the objective 13 forms the image appearing below the halving line in the field of the ocular and that these image portions are complementary. A vertical cross-line V appearing in the field of view as shown in Figure 9 is mounted within the ocular tube 18ª in the focal plane of the ocular, that is, in the plane of the image relayed by the reversing lens 17. This cross-line assists the observer in adjusting the ocular comprising the lenses 15 and 16 to his eye and assists him in keeping the image of the object sighted in the center of the field.

Intermediate one or both of the objectives and the ocular prism, I provide a deflecting prism or optical wedge for shifting the image portions along the dividing line one relatively to the other.

While a single deflecting prism may be interposed in the axis of one of the objectives alone, I prefer instead, to employ two prisms, namely 21 and 22, one in the axis of each of the objectives 12 and 13 respectively, arranged with their bases facing one another, and mounted on a common carriage 23 which is longitudinally movable within a suitable slideway 24 extending in the direction of the longitudinal axis of the instrument. For moving the deflecting prism carriage 23 along the slideway 24, I may provide a screw or worm 25 journaled at 26 and 27 and engaged by a nut 28 that is secured to the carriage 23. This screw is operated through bevel gears 30 and 31 by a shaft 32 which projects through the exterior of the casing 14 and is provided with a hand wheel 33, thus rotation of the hand wheel 33 in one direction or the other rotates the screw 25 in a corresponding direction and causes the carriage 23 to move along its slideway 24 either toward or away from the objectives 12 and 13, carrying with it the deflecting prisms 21 and 22. The objectives 12 and 13 are so adjusted laterally that when the prisms 21 and 22 occupy a position as shown in dotted lines in Fig. 8 adjacent the ocular prism the image portions will be normally superimposed directly over one another and the image of the vessel sighted will appear as viewed in an ordinary telescope. When the deflecting wedges or prisms 21 and 22 are moved toward the objectives the image portions will move in opposite directions along the dividing line H until their opposite ends coincide. The movement of these wedges necessary to produce this coincidence depends on and is proportional to the angle subtended by the length or apparent length of the object sighted. Accordingly, a translucent scale 34 is attached to the casing 14 with its zero point toward the ocular prism, and on the carriage 23, in suitable relation to the scale 34, is provided an index 35 which co-operates with the scale to indicate the angle measured by the instrument when the image portions are brought into coincidence as shown in Figure 9. The scale 34 is preferably graduated to indicate the angle A' O B' or A O B in degrees, minutes and seconds, but any designation for indicating the various angle amplitudes may be used. To facilitate the reading of this scale, I provide an optical system adapted to project an image of the index and the adjacent portion of the scale into the field of the ocular, as shown in the lower portion of Figure 9. This comprises a prism 36 with which co-operates an objective 37 arranged to have its principal focal plane in the plane of the scale 34 whereby the image of the index and scale is projected along a parallel beam of light to the objective 38, arranged with its principal focus coincident with the focal plane F and is thus adapted to present the image of the index and scale in the field of the ocular and erecting system as shown in Figures 8 and 9. The scale may be illuminated through a window 39, provided in the casing wall adjacent the scale.

For solving the triangle A O B and determining the angle A P O from the data obtained from the scouts, range readers, and the observer, the plotter is provided with a calculator which may comprise a set of tables such as illustrated in Figure 10.

Each of the tables consists of a pair of supplementary angles representing the angle A P O acute, and the angle A P O obtuse, which are derived from a solution of the triangle A O B on a base line representing or approximating a given ship's length A B and which are calculated for different ranges of a ship such as 2 relatively to the vessel 1 and for different angles A O B, each pair of supplementary angles being arranged at the intersection of a column denominated by their respective angles A O B with a row denominated by their respective ranges. Thus the table shown in Figure 10 is calculated on a base line of 402 feet and gives the angle A O P obtuse or acute for every angle A O B from one degree and thirty minutes down to zero by steps of thirty seconds and for every range of the ship 2 relativley to the vessel 1 from 5000 to 7500 yards by steps of 100 yards. In such a table the maximum angle A P O given is 90 degrees and since the supplement of 90 degrees is equal to the angle itself, and since the supplement of the angle zero is 180 degrees or a straight line, it is clear that it is only necessary to enter the angle 90 degrees and zero respectively where they occur. A set of tables in practical use may comprise individual tables such as shown in Figure 10, calculated on different base lines ranging, say, from 300 to 900 feet by steps of two feet and bound in book form.

A practical example of the method and apparatus in operation, is as follows: Presuming the course of the ship 1 to be due north and presuming the plotter to have been informed that the length A B of the enemy ship is 402 feet and that its range is 5000 yards, the plotter plots the ship 1 and the observing station O thereon and opens his set of tables to the table designated 402 feet; the observer meanwhile has trained the instrument 10 on the enemy ship and brought the image portions into coincidence. Observing the image of the ship sighted, he sees that the bow of the enemy ship is on the bow side of the bearing line O P and that the angle A P O must be acute, as shown in Figure 1; reading the scale 34, he finds that the angle A O B is one degree twenty-eight minutes; and referring to the azimuth circle 102, he finds that its bearing is 90°, or directly off the beam of the ship 1. This data as obtained. the observer communicates to the plotter, let us presume, by telephone. The plotter, on receiving the magnitude of the angle A O B, finds the intersection of the column headed by this angle with the range row, and finds that the angle A P O is either 60 degrees or 120 degrees. However, having been informed that the angle A P O is acute, he selects 60 degrees. On receiving the bearing of the ship 2, he draws the line O P, lays off 5000 yards along this line to a suitable scale, describes a line in the direction A B as shown in Figure 1, having the angle A P O equal to 60 degrees, and laying off the distance representing approximately 402 feet, half on each side of the point P. he indicates, having been informed by the observer that the bow A is on the bow side of the bearing line O P, the position of the bow A and thus the direction in which the ship 2 is traveling. Had the observer informed him that the angle A P O was obtuse and that the bow A was on the stern side of the bearing line, he would have used the supplement of the angle 60 degrees, that is, the angle 120 degrees. and indicated the bow on the stern side of the bearing line O P as shown in Figure 2. Had the observer reported that the angle A P O was obtuse, and that the bow was on the bow side of the bearing line, the plotter would have used the angle 120 degrees and indicated the bow on the bow side of the bearing line O P as shown in Figure 3; and had the observer reported that the angle A P O was acute and the bow on the stern side of the bearing line, the plotter would have used the angle 60 degrees and indicated the bow on the stern side of the line O P as shown in Figure 4.

In event of the ship 2 occupying the position shown in full lines in Figures 5 and 6 relatively to the ship O, it will be seen that reference to the appropriate chart shown in Figure 10 will indicate to the plotter that the angle A P O is a right angle, and thus he need only know on which side of the bearing line the bow of the ship 2 lies in order to plot the enemy ship and indicate the direction in which it is traveling. Similarly, if the ship 2 is plying on either of the courses shown in Figures 5 and 6 in dotted lines, the observer will know that the course of the enemy ship is parallel to the bearing line O P and he need only know whether the bow or stern of the enemy ship is remote, in order to indicate whether the ship 2 is traveling away from the vessel 1 as shown in Figure 5, or bearing on it, as shown in Figure 6.

If preferred, a magnetic or gyroscopic compass may be located near the plotter's board in full view of the plotter and electrical or mechanical devices provided to cause such remotely situated compass to register with the axis of the optical instrument 10, and also the movement of the deflecting prism carriage 22 may register the angles A O B in a position where it may be viewed by the plotter, through suitable transmission means; in which case the observer would only have to directly communicate to the plotter the character of the angle A P O and the position of the bow A relative to the bearing line O P.

It has already been stated that the vertical cross-line V assists in adjusting the ocular and in keeping the object sighted in the center of the field, and also that the index 35 co-operates with the scale 34 to indicate the specific point of the scale corresponding to the instantaneous position occupied by the prisms 21 and 22. However, if the field of view of the ocular be small or particularly fine graduations be used on the scale 34, the index 35 may be dispensed with and the cross-line V utilized to index with the scale, and if it is inconvenient or otherwise undesirable to place the cross-line V in the field of the instrument the image of the scale 34 and the index 35 may be utilized for setting the accommodation of the observer's eye and adjusting the ocular for his refraction and may also be utilized for centering the image of the object sighted.

I claim:

1. The method of obtaining data for plotting, relatively to an observing station, an elongated object of known length isolated from the observing station and at a known distance therefrom, consisting in sighting the object from the observing station to ascertain its angular position relatively to said observing station, optically measuring the angle subtended by the object's apparent length as viewed from the observing station, observing the relative position of a specified end of the object, determining by inspection the magnitude, within certain limits, of the angle included between a straight line extending from the observing station to the object and the longitudinal axis of the latter, and solving the triangle formed by the sight lines from the station the two ends of the object and the longitudinal axis of the object to obtain the value of said specified angle.

2. The method of obtaining data for plotting, relatively to an observing station, an elongated object of known length isolated from the observing station and situated at a known distance therefrom, consisting in sighting the object from the observing station to ascertain its angular position relatively to said observing station, optically measuring the angle subtended by the object's apparent length as viewed from the observing station, observing the relative position of a specified end of the object, determining by inspection whether the angle included between a straight line extending from the observing station to the object and the longitudinal axis of the latter is acute or obtuse, and obtaining the value of said specified angle with a calculator having as indexes the length of the object, the distance thereof from the observing station, the angle subtended by its apparent length and the acute or obtuse character of the angle sought.

Signed at Washington, District of Columbia, this tenth day of May, 1919.

HENRY A. ORR.